UNITED STATES PATENT OFFICE.

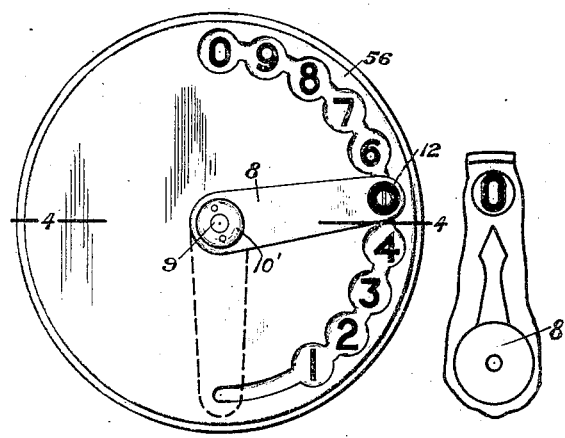
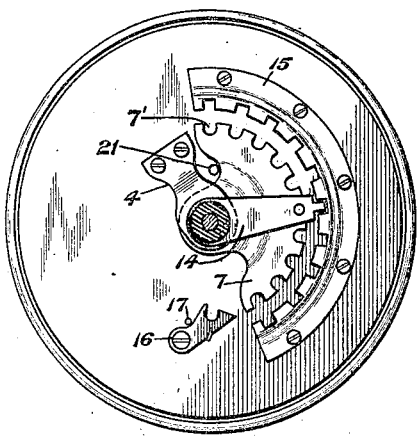
Fig. 1. Fig. 13. Fig. 2.
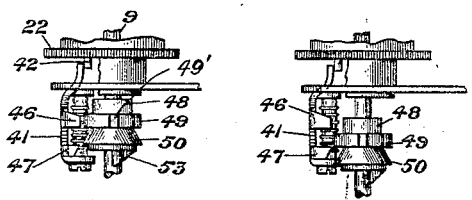
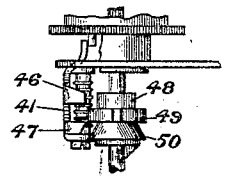
Fig. 5. Fig. 6.
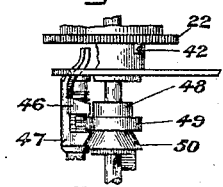
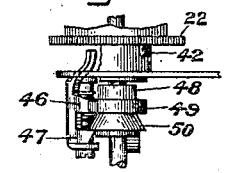
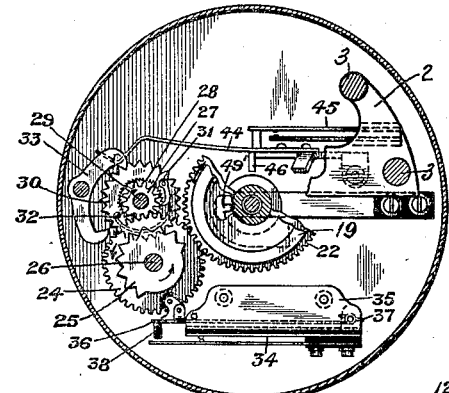
Fig. 7. Fig. 8. Fig. 3.
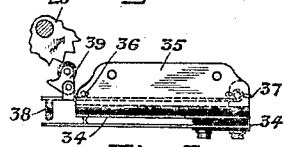
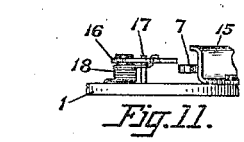
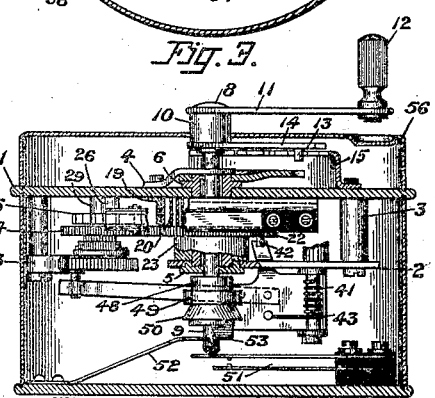
Fig. 9. Fig. 11.
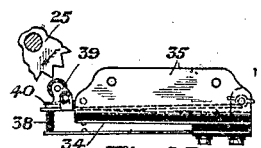
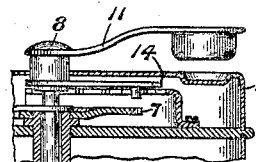
Fig. 10. Fig. 12.
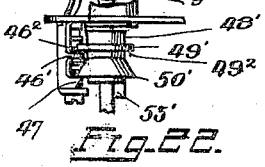
Fig. 22. Fig. 4.
Witnesses:
A. Dahl
J. E. Hilbich
Inventor:
George E. Mueller.
By Curtis B. Camp
Attorney G. E. MUELLER.
CALLING DEVICE.
APPLICATION FILED MAR. 20, 1911. RENEWED FEB. 3, 1913.
1,119,526.
Patented Dec. 1, 1914.
2 SHEETS—SHEET 2.
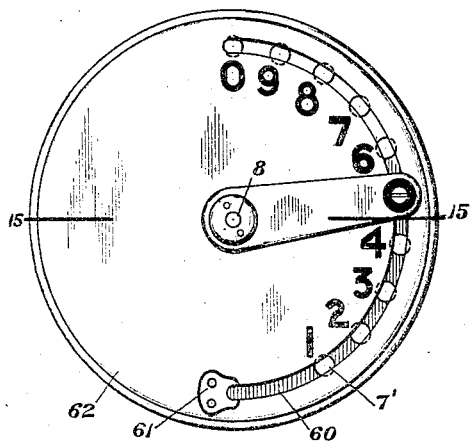
Fig. 14.
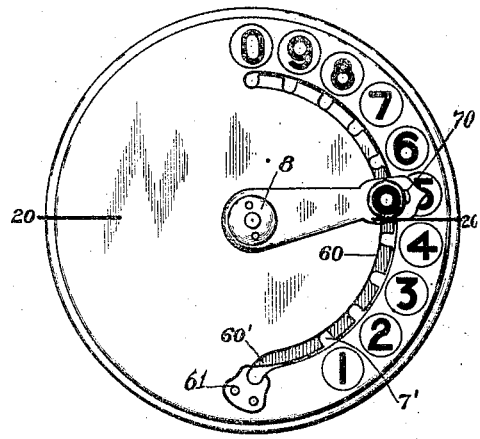
Fig. 19.
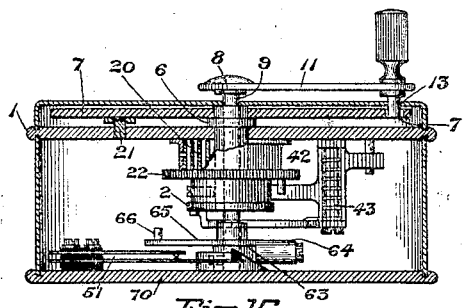
Fig. 15.
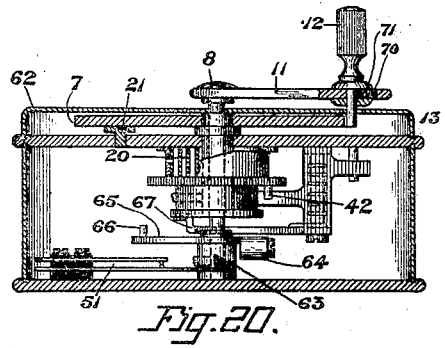
Fig. 20.
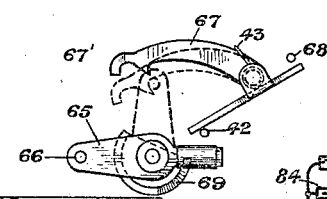
Fig. 16.
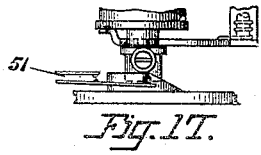
Fig. 17.
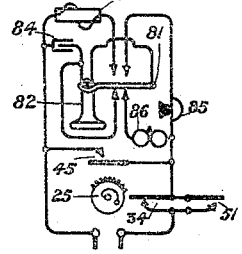
Fig. 21.
Fig. 18.
Witnesses:
A. Dahl
J. E. Hilbish
Inventor:
George E. Mueller
By Curtis B. Camp
Attorney:

GEORGE E. MUELLER, OF LA GRANGE, ILLINOIS, ASSIGNOR TO KELLOGG SWITCHBOARD & SUPPLY COMPANY, OF CHICAGO, ILLINOIS, A CORPORATION OF ILLINOIS.

CALLING DEVICE.

1,119,526.   Specification of Letters Patent.   Patented Dec. 1, 1914.

Application filed March 20, 1911, Serial No. 615,575.   Renewed February 3, 1913.   Serial No. 746,052.

*To all whom it may concern:*

Be it known that I, GEORGE E. MUELLER, a citizen of the United States, residing in La Grange, county of Cook, State of Illinois, have invented certain new and useful Improvements in Calling Devices, of which the following is a specification.

My invention relates to calling devices for directively controlling automatic switches, and particularly to that type in which a setting member is adapted to be actuated by the operator for winding up or setting the impulse mechanism.

My invention, as illustrated, is preferably arranged for a two wire or metallic line system in which the automatic switches are operative responsive to interruptions of the metallic circuit. In such a system as outlined, and particularly where slow acting relays are used, and are effected by these interruptions, it is an advantage to have such a device when once released for transmitting impulses after being set up by the operator, so arranged that the impulse mechanism will not be interferred with until it is restored to normal, so that the predetermined period of interruptions will not be altered after the device is once set in motion, the object of my invention being to provide such a device which is simple of construction, cheap to manufacture and readily accessible for adjustment.

Referring to the accompanying drawings for a better understanding of my invention, Figure 1 is a face view of a preferred form of my invention showing the actuating or setting member; Fig. 2 is a front view with the number plate and the setting member removed, disclosing the inner lever which is adapted to engage any one of a plurality of holds for setting the impulse mechanism; Fig. 3 is a front view with the plate and mechanism illustrated in Fig. 2 removed, showing the impulse mechanism; Fig. 4 is a partial section along the line 4—4 of Fig. 1, and illustrates some of the working parts of the device; Fig. 5 shows particularly the locking cam and pawl for the setting member in a normal position; Fig. 6 shows the locking cam in position when the setting member has been pressed inwardly to an engaging position at one of the numbers; Fig. 7 shows the locking pawl in an off normal position after the setting member has been moved forward to the end of its movement; Fig. 8 shows the locking cam moved upward after it has been moved forward to the limit of its movement and released by the operator; Fig. 9 illustrates the impulse springs showing particularly the means for preventing opening of the contacts during the setting operation; Fig. 10 shows the manner in which the impulse wheel acts on the impulse springs to open their contact while it is traveling in the direction of the arrow indicated thereon, which is its direction during the transmitting operation; Fig. 11 is a front elevation of the locking pawl shown in Fig. 2; Fig. 12 is a modified form of the setting member illustrated in Figs. 1 and 4; Fig. 13 is another modified form of the setting member; Fig. 14 is a modified form of the device illustrated in Figs. 1 to 13; Fig. 15 is a partial cross-section along line 15—15 of Fig. 14; Fig. 16 illustrates a portion of the locking mechanism and shunt springs of the said modified device; Fig. 17 is a front elevation of the mechanism of Fig. 16 but with the setting member in a fully operated position; Fig. 18 is a modification of the setting member illustrated in Figs. 14 and 15; Fig. 19 is a face view of another modification of the device illustrated in Figs. 1 to 13; Fig. 20 is a partial cross-section along the line 20—20 of Fig. 19; Fig. 21 is a conventional circuit arrangement for the calling device as illustrated, when used in connection with a substation telephone line. Fig. 22 illustrates a modification of the locking mechanism of Fig. 8 whereby the setting member 8 is held out of operative engagement with the impulse mechanism during its operation but whereby said setting member 8 is free to rotate.

Referring now to the device illustrated on Sheet 1, a main mounting plate is provided, to which is secured a bridge plate 2, by means of studs 3. A bearing bracket 4 is screwed fast to the upper or outer surface of plate 1, and the cap bearing 5 is staked into the bridge plate 2. In the plate 1, a bearing is provided for the upper end of shaft 6, while the lower end of shaft 6 has its bearing in the cap 5. The bracket 4 rests against the uppermost end of shaft 6, thus preventing any lateral motion thereof. A slotted plate 7 is securely fastened to the upper end of shaft 6 and is adapted to be rotated with shaft 6.

The setting plate 7 has a series of slots $7^1$ in the periphery thereof, preferably ten in number, which are adapted to be engaged according to the number of impulses it is desired to transmit, the device as illustrated being adapted to transmit from one to ten impulses, although it is to be understood that the number of impulses may be varied according to the construction of the device. The shaft 9 has its bearings in the bracket 4, and cap 5, and extends through the shaft 6, being free of the said shaft 6 so that one shaft cannot interfere with the proper operation of the other, and it will be seen that the bearings for the two shafts are independent of each other. The hub 10, which is suitably fastened to the upper end of shaft 9 carries a lever 11, which is detachably secured to hub 10 by lock nut $10^1$, and to the free end of lever 11 is rotatably fastened the handle 12. At the lower end of the hub 10 the arm 14 is securely fastened, carrying at its outer end a pin 13, which is adapted to engage any of the slots $7^1$ in the setting plate 7.

In referring to setting member 8, I include the arm 14 and lever 11 and the parts carried thereby.

The cap 56 is suitably secured to the plate 1, and has arranged near its periphery ten index numbers preferably set in depressions connected by a slot depression to indicate to an operator the direction of rotation of the setting member.

The shaft 9 may partake of a rotary or lateral motion, as it will be seen that it may be moved laterally in the bearings 4 and 5 when moving the setting member 8 to engage the setting plate 7, and the setting member may then be rotated.

A notched plate 15 is rigidly secured to the upper surface of plate 1, the notches thereon being large enough to easily clear the square projection on the end of arm 14, each notch being so disposed that when the setting member is moved to about the center of one of the index numbers it may be pressed inwardly, so that the pin 13 will engage the corresponding slot $7^1$. This plate 15 is preferably arranged to prevent interference between certain parts of the device, as will be more fully pointed out farther on.

Means for holding the setting member 8 in an actuated position is provided preferably in the form of a locking pawl 16 which is pivoted to plate 1, being held against the pin 17 by its spring 18. This pawl 16 lies in a plane above the upper surface of the plate 7 so that when the plate 7 is rotated it will pass below and clear pawl 16, as illustrated in Fig. 11. This pawl 16 serves as a stop for the setting member 8 when rotated, by reason of the engagement with its slotted portion by the pin 13. When the pin 13 moves into engagement the slot of pawl 16, any further rotary motion thereof is prevented until it is moved laterally out of engagement with the said pawl 16. This pawl serves to prevent further forward motion of the setting member, and also prevents backward motion after it is moved to the limit of its stroke, so that when the operator releases his hold upon the setting member 8 it will disengage itself from the adjusted mechanism so that the mechanism may operate.

The spring barrel 19, which is adjustably secured to plate 1, has the outer end of a coiled spring 20 attached thereto, while the inner end of spring 20 is suitably secured to shaft 6. The tension of spring 20 is in a reverse clockwise direction, thus holding the plate 7 against the stop pin 21 when at normal. This spring 20 is preferably provided for the purpose of operating the impulse mechanism after the said mechanism has been adjusted by the setting member 8, and released.

Below the spring barrel 19 a gear 22 is rigidly secured to the hub 23, which in turn is adjustably fastened to shaft 6. The gear 24 which is in mesh with gear 22, carries an impulse wheel 25, both gear 24 and impulse wheel 25 being securely fastened together but free to rotate upon shaft 26, which is secured to plate 1. A pinion 27, which is in mesh with gear 24, carries a ratchet wheel 28, the said pinion 27 and wheel 28 being securely fastened together and free to rotate upon shaft 29, which is also rigidly secured to plate 1. On the shaft 29 is also an escapement wheel 30, to which is pivotally secured a pawl 31, which is held against the teeth of ratchet wheel 28 by the spring 32.

In the operation of the device, the setting member is moved inwardly to engage the slotted setting plate 7, and then rotated in a clockwise direction for the purpose of setting or adjusting the impulse mechanism, thereby rotating the gear wheels in the direction indicated by the arrows thereon. As the pinion 27 carries the ratchet wheel 28 in the direction of its arrow, the teeth of the ratchet 28 move by the pawl 31, thus preventing rotation of the escapement wheel 30, during the setting movement of the device. This ratchet wheel 28 and pawl 31 are provided to allow a quick forward setting movement of the device, as otherwise, due to the governor action of the escapement wheel 30 and pallet 33, a quick setting movement would be prevented, but it will be noted that when the mechanism is released for operation, the gears move in a direction opposite of that indicated by the arrows thereon, and will cause the teeth on ratchet wheel 28 to operatively engage pawl 31 and thereby cause the escapement wheel 30 to cooperate with pallet 33 and retard the return of the device at a predetermined rate of travel.

The impulse springs 34 are insulatingly mounted on bracket 35, said bracket being secured to the under side of mounting plate 1. The arm 36 is pivoted to mounting bracket 35, and normally rests against stop pin 36 under tension of spring 37, the insulating stud 38 which is fastened to the free end of arm 37 being normally clear of the impulse springs 34. The roller bracket 39 is pivoted to the free end of arm 37, being held in its normal position, as illustrated in Figs. 3 and 10, under tension of spring 40. Roller bracket 39 is so adjusted that when the impulse mechanism is moved forward during the setting or adjusting movement, the teeth of impulse wheel 25 move in the direction of their arrow and act upon roller bracket 39 as illustrated in Fig. 9, thus preventing any interruption of contact springs 34. Upon the return of impulse wheel 25 in the direction indicated by the arrow thereon in Fig. 10, the teeth act upon roller bracket 39 as illustrated in Fig. 10, thereby interrupting the contact between springs 34 a single time for each tooth which has been moved beyond roller bracket 39 during the adjusting operation.

Impulse wheel 25 is so adjusted upon its shaft with relation to the roller bracket 39 that it requires a movement equal to the distance between two teeth thereof to bring it into operative relation with said bracket 39 initially, while setting plate 7 is so adjusted that its first slot $7^1$ is distant from the slot in stop pawl 16, the distance between two of the slots $7^1$.

Locking pawl 41 is pivotally secured to the under side of bridge plate 2, and normally rests against pin 42 of gear 22 under tension of spring 43, which has one end fastened to the locking pawl 41 and the other end secured to the pivot bolt.

An auxiliary locking member 44, preferably of some flexible material, is rigidly fastened to locking pawl 41, and is adapted to engage a pin in pallet 33 to prevent movement of the said pallet 33 during this engagement. A pair of normally open shunt springs 45 are provided for the purpose of shunting the substation apparatus during the interruption of contact 34, the said springs being insulatingly mounted on a bracket secured to the underside of bridge plate 2, and being preferably arranged to be actuated by movement of pawl 41, as illustrated in Fig. 3. Said springs 45 are not included in Fig. 4 to prevent confusion of the drawing, as it is believed they are sufficiently illustrated in Fig. 3.

It will be seen that when gear 22 is moved off normal, the free end of locking pawl 41 moves inwardly, thereby moving the auxiliary lock 44 out of engagement with pallet 33, and also closing spring contacts 45. Upon a return of gear 22 to normal, pin 42, which is carried thereby, again engages the pawl 41 moving it to normal, whereby contacts 45 are again opened, and the pin in pallet 33 is again engaged by auxiliary locking member 44. At the end of pawl 41 two teeth 46 and 47 are formed, to coöperate with the locking cam 48 which is adjustably fastened to the lower end of shaft 9. The tooth 46 is adapted to coöperate with the annular ring 49, and the tooth 47 coöperates with the annular beveled cam 50. The ring 49 is provided with a slot $49^1$, as illustrated in Fig. 3, the said slot being in such a position that when the setting member 8 is moved to the end of its forward stroke, so that pin 13 is engaged by the slot in locking pawl 16, said slot $49^1$ will be directly below tooth 46 when pawl 41 is in its off normal position as illustrated in Fig. 7. This slot $49^1$ is slightly larger than the thickness of tooth 46 so that the tooth is free to slide in said slot without any undue friction.

To hold the setting member 8 normally out of engagement with the setting plate 7, the shunt springs 51 are mounted so that the longer one presses against the lower insulated end of shaft 9, thereby pressing it upward and holding arm 14 and pin 13 in the position illustrated in Fig. 4, so that it is free to be revolved. The shunt springs 51 are preferably provided when the device is wired as illustrated in Fig. 21, to prevent sending false impulses, that is, should the operator move the setting member 8 into engagement with plate 7, then rotate member 8 part way and then release it, the said member 8 would be locked in its inward or engaging position due to the locking action of pawl 41 and locking cam 48, but said member 8 would be free to rotate to normal, and upon reaching normal said member 8 would be moved out of engaging position thereby again allowing the contact springs 51 to open.

Fig. 5 illustrates the locking pawl 41 in its normal position and the locking cam 48 with the setting member 8 in the position illustrated in Fig. 4. When the setting member 8 is pressed inwardly so that pin 13 engages a slot in plate 7, the locking pawl 41 assumes the position illustrated in Fig. 6, in a position for tooth 46 to move over the upper surface of ring 49, as illustrated in Fig. 7, when the setting member is rotated. Thus it will be seen that should the operator press the setting member inwardly, and rotate it forward part way, it would be impossible to withdraw the setting member from engagement with the plate 7, due to tooth 46 engaging the upper surface of ring 49 and preventing the withdrawal of said member 8 until it has been rotated back to normal, when the pin 42 in gear 22 moves locking pawl 41 into its normal position, as illustrated in Figs. 3 and 5.

Fig. 7 shows the cam 48 with setting member 8 in an actuated position, as illustrated by the dotted lines in Fig. 1, and before it has been moved out of its engaging position. It will be noted that the slot 49¹ is directly below tooth 46 so that when the operator releases his hold upon setting member 8, the tension of shunt springs 51, and tension springs 52 which is now pressing against the portion 53, forces setting member 8 upward into the position illustrated in Fig. 8 with the tooth 46 in the slot 49¹ and tooth 47 in engagement with the lower surface of annular bevel cam 50, thereby preventing rotary motion of setting member 8, due to the locking action of tooth 46, and preventing the operator from again forcing the setting member 8 inwardly to interfere with the return of the setting plate 7 and the rest of the impulse mechanism. It will be noted that in Fig. 7 the beveled surface of tooth 47 rests in engagement with the beveled surface of annular cam 50 so that when the operator releases his hold upon setting member 8, after it has been rotated to its stop, said setting member 8 starts its movement out of operative relation with the impulse mechanism, and cam 50 forces the free end of locking pawl 41 outwardly, thereby causing the end of auxiliary locking member 44 to engage the pin in pallet 33. As the setting member continues in its upward movement, pin 13 disengages itself from plate 7, but movement of the mechanism is prevented until auxiliary locking member 44 disengages itself from pallet 33, which does not occur until setting member 8 has been moved upwardly far enough to allow tooth 47 to snap under the lower surface of the annular bevel cam 50, as illustrated in Fig. 8. The auxiliary member 44 is provided so that it will be unnecessary to provide exact adjustment and simultaneous coöperation between tooth 47 and the lower surface of cam 50, the disengagement of pin 13 and plate 7, and the opening of shunt springs 51. By means of this locking member 44, such close adjustment is unnecessary to secure a proper operation of the device and still prevent interference thereof by the operator.

While in Figs. 1 and 4 I have illustrated a setting member having a handle at the outer end of the lever 11, a finger hold member, such as illustrated in Fig. 12, may be used, or a knob and pointer arrangement, such as illustrated in Fig. 13, may be used, any one of these arrangements being adaptable for the setting operation of the impulse mechanism.

Fig. 21 illustrates diagrammatically the calling device connected to a substation telephone. The telephone is a well known circuit arrangement and comprises the usual switch hook 81, receiver 82, impedance coil 83, and condenser 84, a call bell 86 normally in bridge of the line conductors with the condenser 84, and a transmitter 85, which is adapted to be connected in circuit when the receiver is removed from the switch hook. Impulse springs 34, which are adapted to interrupt the metallic circuit of the line, are operable by the impulse wheel 25 only on its return to normal from an adjusted position as described in connection with the calling device of Figs. 1 to 13. Shunt springs 45 are adapted to be closed while the impulse mechanism is off normal, thereby shunting the telephone apparatus during the interruption of the line circuit by impulse springs 34. Shunt springs 51 are connected in shunt of impulse springs 34, and are adapted to operate as is explained in the description of the operation of the calling device.

*Operation of calling device Figs. 1 to 13.*—Assuming the device is used in connection with a circuit arrangement as illustrated in Fig. 21, and that the operator desires to cause five interruptions of impulse springs 34, the said member 8 is moved into the position illustrated in Fig. 1, which is above the index number 5, and then pressed inwardly until the lower end of hub 10 engages the upper surface of bracket 4, thereby causing pin 13 to engage the fifth slot 7¹ in plate 7 and closing shunt springs 51. With the setting member 8 in this engaging position, the locking cam 48 is in the position indicated in Fig. 6. The operator now rotates setting member 8 in a clockwise direction for the purpose of adjusting the impulse mechanism, until pin 13 moves into the slot of stop pawl 16, thereby preventing any further advance of the setting member. The gearing and impulse wheel 25 are so proportioned that this setting movement of member 8 causes five teeth of impulse wheel 25 to move beyond the roller bracket 39 without causing any interruption of impulse springs 34, as previously described. As the gear 22 leaves normal, pin 42 carried thereby, moves away from locking pawl 41, allowing it to assume the position indicated in Fig. 7, whereby member 44 is out of engagement with pallet 33 and shunt springs 45 are closed.

During the setting movement of the device, and as the member 8 reaches its fully operated position as indicated by the dotted lines in Fig. 1, spring 52 rides upon the lower end of projection 53, thereby causing extra lateral pressure upon shaft 9 in addition to the pressure of springs 51. The operator now releases his hold or the inward lateral pressure upon setting member 8, which is prevented from being rotated backward by the locking action of pawl 16, but the pressure upon the lower end of shaft 9, due to the spring tension of springs 51 and 52, moves shaft 9 and the parts carried thereby upward as soon as this lateral inward pressure is removed, as at this time the slot 49¹ in the annular ring 49 is directly below tooth 46, as shown in Fig. 7, thus allowing this upward movement. At the time the operator releases his hold upon setting member, as stated, locking cam 48 is in the position illustrated in Fig. 7, and as it moves upward, due to the action of spring tension as stated, the bevel cam 50 engaging the beveled surface of tooth 47 moves the free end of locking pawl 41 outwardly, thereby causing the hooked end of auxiliary locking member 44 to engage the pin in pallet 33 and preventing any movement of the impulse mechanism as will be now more fully described. The setting member 8 continues in this upward or disengaging movement, and pin 13 is so adjusted that it will free itself of plate 7 and pawl 16, and shunt springs 51 are so adjusted that their contact will be opened before tooth 47 snaps under the lower surface of cam 50 as illustrated in Fig. 8, this last movement of pawl 41 causing auxiliary locking member 44 to disengage itself from the pin in pallet 33, whereby the impulse mechanism is free to be restored by the action of spring 20, causing five interruptions of the impulse springs 34.

It will be noted that when setting member 8 is moved to a disengaged position upon release thereof by the operator, and while the impulse mechanism is returning to normal, the tooth 46 is in the slot 49¹ as shown in Fig. 8, thus preventing rotary movement of the setting member 8, and the tooth 47 engaging the lower side of cam 50 preventing inward lateral movement of setting member 8, thereby completely locking member 8 against actuation while the impulse mechanism is operating. Upon the return of gear 22 to normal, pin 42 again engages the extension on locking pawl 41, moving it into its normal position as illustrated in Fig. 3, thereby freeing the setting member and also opening contact springs 45.

Should an operator move the setting member 8 into engagement with the slotted plate 7, and then rotate the setting member part way and release his hold thereon, the said member 8 will not be moved to disengagement as before described, but spring 20 will act upon the mechanism to rotate it and the setting member 8 back to normal, as the setting member not having been moved forward to the stop 16, tooth 46 prevents the springs 51, 52 from acting upon the lower end of shaft 9 to force the said shaft upward. Although the impulse springs 34 have their contacts interrupted by the impulse wheel 25 during the said restoring movement, it will be remembered that the setting member being locked in its engaged position during restoration, shunt springs 51 remain closed and the said springs 51 being connected in shunt of the impulse springs 34, as illustrated in Fig. 21, this interruption of impulse springs 34 is not effective. From this it will be seen that to cause an effective operation of the impulse springs 34, the setting member 8 must be moved to its fully actuated position as previously described so as to engage stop 16.

In order to prevent an operator from moving the setting member in part way and then rotate it, the notched plate 15 is provided, the said plate being so adjusted that the upper surface of arm 14 must be brought clear of the lower surface of the notched plate 15 before the setting member 8 can be rotated. Thus it will be seen that to operate the device, it is necessary to press the setting member inwardly far enough to get a proper operation of the shunt springs 51, and a locking position of cam 48 before the setting member 8 can be rotated.

*Calling device of Figs. 14 to 18.*—The calling device illustrated in Figs. 14 to 17, inclusive, which is a modification of the device illustrated in sheet 1, comprises plates 1 and 2, which support the hollow shaft 6, through which extends the shaft 9 of the setting member 8. In this modified structure, the pin 13 is preferably secured directly to the lever 11, and is adapted to be inserted through the slot 60 to engage any of the holes 7¹ in the setting plate 7. A stop for the forward movement of the setting member 8 is provided, preferably in the form of a plate 61, securely fastened to the face of the cap 62 to be engaged by pin 13 in the forward movement of setting member 8.

In Fig. 15 the impulse mechanism which includes the impulse springs 34 and coöperating gears and governor escapement, is not illustrated, as the same mechanism as illustrated in Figs. 3 and 4 may be used in connection with the device of Fig. 15.

At the lower end of shaft 9, a hub 63 is provided, being securely fastened to the said shaft and carrying a roller 64 and an arm 65 in which is securely fastened a pin 66. A locking pawl 67 is provided for locking the setting member 8 in its fully actuated position, the said pawl 67 being pivotally secured to the plate 1, and normally held against pin 42 by means of the spring 43. When the setting member 8 is actuated, pin 42 moves away from the arm of pawl 67 and the spring 43 then rotates pawl 67 about its pivot until stop 68 is engaged by the other extension of pawl 67, the said pawl assuming the position indicated by the dotted lines as shown in Fig. 16. At the end of pawl 67, an off set projection 67¹ is provided for the purpose of preventing an incorrect operation of the device, as will be more fully explained.

The cam ring 69, which is rigidly fastened to the plate 70, has its inclined surface so disposed that when the setting member 8 is operated, roller 64 rides upon this inclined surface, forcing the shaft 9 and setting member 8 upward, and thereby disengaging pin 13 from plate 7, and at the same time roller 64 rides upon the rubber buffer of shunt springs 51 opening their contact, and at the same time pin 66 engages locking pawl 67, as illustrated by the dotted lines in Fig. 16. The arm 65 is so adjusted on shaft 9 that as the roller 64 rides upon the inclined surface of cam 69, and rests upon the upper horizontal surface of cam 69, the upper surface of the arm 65 will just clear the lower surface of pawl 67, as shown in Fig. 17. It is also to be understood that a pair of shunt springs 45, as illustrated in Fig. 3, may be provided to coöperate with pawl 67 of the device of Fig. 15.

The setting member illustrated in Fig. 18 is adapted for use with the device of Figs. 14, 15, the cup shaped finger hold at the end of lever 11 taking the place of handle 12 and the spring 75 being adapted to hold the setting member out of operative engagement with the impulse mechanism.

With the calling device of Figs. 14 to 17 inclusive connected, as illustrated in Fig. 21, the operation thereof is as follows:

Assuming the operator desires to cause five interruptions of the impulse springs, the setting member 8 is moved to a point opposite the fifth hole, which is the position illustrated in Fig. 14, and then moved inwardly to engaging position, as illustrated in Fig. 15. The setting member 8 is then rotated in a clockwise direction until pin 13 engages the stop 61. As the gear wheel 22 moves off normal, responsive to this setting movement pin 42 moves away from pawl 67 allowing the said pawl to move into the position illustrated by the dotted lines of Fig. 16. As the setting movement of the member 8 is continued, the roller 63 rides upon the inclined surface of cam 69, the pin 66 at the same time moving beyond the locking tooth of pawl 67 into the position indicated by the dotted lines in Fig. 16, and as illustrated in Fig. 17, this being the fully actuated position of the setting member 8. As at this time pin 13 is engaging stop 61 a farther forward movement of setting member 8 is prevented, while due to the engagement between pin 66 and locking pawl 67, a return in the rotary direction of setting member 8 is prevented, and the arm 65 projecting under pawl 67, as illustrated by the dotted lines in Fig. 16, it will be seen that said member 8 is locked against actuation.

Returning to the movement of roller 64 upon the inclined surface of cam 69, the lateral movement of setting member 8, due to this riding of roller 64 upon cam 69, is such that as the roller reaches the top of the incline, pin 66 snaps behind the pawl 67, shunt springs 51 are opened, and pin 13 is simultaneously moved out of engagement with the slotted plate 7, thus allowing spring 20 to cause a restoration of the impulse mechanism and the consequent five interruptions of impulse springs 51. As gear wheel 22 returns to normal, pin 42 again engages the extension on pawl 67, restoring it to normal and thereby unlocking the setting member 8 for further actuation.

Should an operator move setting member 8 into engagement with a hold $7^1$ in plate 7 and then rotate the setting member forward part way and again withdraw the setting member to a disengaged position, the mechanism will restore to normal, but the setting member 8 not having been moved to a fully actuated position, shunt springs 51 remain closed thereby preventing an effective operation of the impulse springs. To prevent the operator from operating the device as just stated, and then rotating setting member 8 to a fully actuated position and forcing the roller 64 inward to open the shunt springs, the off set end $67^1$ is provided. It will be seen that should an operator withdraw setting member 8 far enough to allow plate 7 and mechanism to start restoration, the arm 65 and pin 66 will be raised up far enough for the pin 66 to engage the outermost end of part $67^1$, thereby preventing a rotation of setting member 8 to a fully actuated position with the mechanism off normal, except when said member is in an engaging position with pin 13 in one of the holds $7^1$.

*Calling Device of Figs. 19-20.*—In Figs. 19 and 20 another form of calling device is illustrated which is a modification of the other devices described, the principal difference being that to disengage pin 13 from setting plate 7, said pin 13 is moved outward from the hold $7^1$ instead of upward as in the other devices.

In the outer cap 62 a slot 60 is provided, preferably arranged with its lower end $60^1$ curved outward and with the stop 61 secured at the extreme end, as illustrated in Fig. 19.

Arm 11 of setting member 8 has a slot 70, through which projects the pin 13. The end of lever 11 is partially shown in section to illustrate the manner in which the pin 13 and handle 12 are held in their normal position by means of spring 71, the said handle 12 and pin 13 being slidably supported in said lever 11 and movable in slot 70.

When setting member 8 is in an engaging position, and upon its forward movement by the operator, pin 13 moves along in slot 60 until it reaches the curved end 60¹ when the continued forward movement of setting member causes the curved end 60¹ to force the pin 13 and handle 12 outward against tension of spring 71 until pin 13 disengages itself from plate 7 whereby the mechanism is restored. The disengaging movement of pin 13 being in a direction away from the center of the device, instead of upward as in the case of the other calling devices, a cam ring 69 is not provided, but roller 64 is adapted to coöperate with shunt springs 51 so as to open their contact simultaneously with the release of the adjusted mechanism.

In Fig. 20 neither the impulse mechanism or shunt springs 45 are illustrated, but it is to be understood that they are to be provided, the same mechanism as described in connection with Fig. 15 being serviceable.

In the operation of the device illustrated in Fig. 19, the setting member 8 is moved to a point opposite one of the numbers 1 to 0, according to the number of impulses or interruptions desired, and the setting member 8 is then moved inwardly whereby the pin 13 engages the corresponding hold 7¹. The setting member 8 is then rotated in a clockwise direction until pin 13 engages stop 61, the travel of pin 13 along curved slot 60¹ causing its release of plate 7 and allowing the impulse mechanism to restore under influence of spring 20, causing the proper number of interruptions of the impulse springs.

The setting member, upon reaching its fully actuated position in engagement with stop 61, is locked by the coöperation of pin 66, arm 65 and locking pawl 67 as previously described until the mechanism is restored to normal, whereby the pawl 67 is moved out of locking engagement with the setting member, due to the pin 42 acting upon locking pawl 67, as previously described. Upon the restoration of locking pawl 67 to normal, shunt springs 45 have their contact interrupted thereby removing the shunt about the substation apparatus as previously described.

Many changes and variations may be made in the structures as illustrated without departing from the spirit and scope of the invention. While I have illustrated my invention as being applicable for interrupting a metallic circuit, variations may be made in the spring combinations, whereby the device is adaptable for other uses, and while I have described it as operating in connection with a substation telephone, it is to be understood that its use is not to be limited to such. Furthermore, while I have illustrated and described the setting member 8 as being locked against actuation during the sending of the impulses, by changing the relative construction of tooth 46¹ and ring 49¹ so that while the setting member 8 is locked in the position as illustrated in Fig. 22 the upper horizontal surface 49² of ring 49¹ is below the horizontal surface 46² of tooth 46¹, the setting member 8 would be free to rotate during the sending of impulses, but tooth 47¹ will prevent an inward lateral or engaging movement of the setting member. Thus it will be seen that with such a construction, although the setting member would be free to be rotated during the operation of the impulse mechanism, it would be locked out of operative relation therewith.

What I claim as new and desire to secure by Letters Patent is:

1. In a calling device the combination with impulse mechanism, of a setting member adapted to be moved by the operator into operative relation with said mechanism for adjustment thereof, means for moving said setting member out of operative relation with said mechanism after adjustment thereof whereby said mechanism is operated, and means for locking said member against actuation during operation of said mechanism.

2. A calling device comprising impulse mechanism, a setting member normally operatively disengaged from said mechanism and adapted to be moved into operative engagement with said mechanism and thereafter operated for adjustment of the mechanism, and means for locking said member in such engagement during the adjusting operation thereof.

3. A calling device comprising impulse mechanism, a setting member normally operatively disengaged from said mechanism and adapted to be moved into operative engagement with said mechanism for adjustment thereof, means for locking said member in such engagement during adjustment of the mechanism, said member being adapted to be moved out of operative engagement with said mechanism after adjustment thereof, whereby said mechanism is operated.

4. A calling device comprising impulse mechanism, a setting member normally operatively disengaged from said mechanism and adapted to be moved into operative engagement with said mechanism for adjustment thereof, means for locking said member in such engagement during the adjustment of the mechanism, said member being adapted to be moved out of operative engagement with said mechanism after adjustment thereof whereby said mechanism is operated, and means for locking said member against reëngagement during operation of said mechanism.

5. A calling device comprising impulse mechanism, a setting member normally operatively disengaged from said mechanism and adapted to be moved into operative engagement with said mechanism for adjustment thereof, means for locking said member in such engagement during adjustment of the mechanism, and means for automatically operatively disengaging said setting member from said mechanism after adjustment thereof, to release said mechanism for operation.

6. A calling device comprising impulse mechanism, a setting member normally operatively disengaged from said mechanism and adapted to be moved into operative engagement with said mechanism for adjustment thereof, means for locking said member in such engagement during adjustment of the mechanism, means for automatically operatively disengaging said setting member from said mechanism after adjustment thereof to release said mechanism for operation, and a locking member for holding said setting member out of such operative engagement during operation of the mechanism.

7. A calling device comprising impulse mechanism, a setting member adapted to be moved by the operator into operative engagement with said mechanism for adjustment thereof, said member being adapted to be released from such engagement after adjustment whereby said mechanism is operated, and means for locking said member against reëngagement during operation of said mechanism.

8. A calling device comprising impulse mechanism, a setting plate for said mechanism having a series of engaging holds for different degrees of adjustment of said mechanism, a setting member adapted to be moved by the operator into engagement with one of said holds for adjustment of said mechanism corresponding to the selected hold, said setting member being adapted to be released from such engagement after adjustment to release said mechanism for operation, and means for locking said member against reëngagement during operation of said mechanism.

9. A calling device comprising impulse mechanism, a setting member normally operatively disengaged from said mechanism and adapted to be moved into operative engagement with said mechanism for adjustment thereof, means for locking said member in such engagement during adjustment of the mechanism, and coöperative contacts actuated by said setting member and held in actuated position while said setting member is in said engagement.

10. A calling device comprising impulse mechanism, impulse contacts for said mechanism, a setting member for adjusting said mechanism for operation, coöperative contacts, and means for operating and holding said coöperative contacts in an operated position during said adjusting movement of the mechanism, means for restoring said contacts and thereafter operating said mechanism.

11. A calling device comprising impulse mechanism, impulse contacts for said mechanism, a setting member for adjusting said mechanism for operation, coöperative contacts, means for operating and holding said coöperative contacts in an operated position during said adjusting movement of the mechanism, and means for automatically restoring said coöperative contacts after said adjusting movement of the mechanism, and thereafter releasing said mechanism from its adjustment.

12. A calling device including impulse mechanism; a setting member free to be moved by the operator into operative relation with said mechanism and thereafter rotated for adjustment of said mechanism, a stop adapted to engage said setting member when so rotated, and means to prevent the operator from freeing said setting member from said mechanism during said rotation until said drop is engaged.

13. A calling device including impulse mechanism, a setting member normally disengaged from said mechanism and requiring a preliminary operation whereby it is adapted to be actuated by the operator for adjusting said mechanism, and means for holding said member and mechanism in operative relation during adjustment.

14. A calling device comprising impulse mechanism and contacts, means for adjusting said mechanism for operation, coöperative contacts, means for operating and maintaining said coöperative contacts operated during the adjusting movement of said mechanism, and means to prevent operation of said mechanism from its adjustment until said coöperative contacts are restored.

15. A calling device comprising impulse mechanism, a manually operated setting member normally operatively disengaged from said mechanism and adapted to be moved by the operator into operative engagement with said mechanism for the adjustment thereof, and means for automatically disengaging said setting member from said mechanism after the adjustment thereof when the operator releases his hold upon the setting member.

16. A calling device comprising a casing having a dial face, impulse mechanism including a setting plate having a plurality of engaging surfaces for variably adjusting said mechanism suitably arranged within said casing, a slotted aperture in said dial face, and a setting member having an engaging stud adapted to project through said slotted aperture to engage any of said engaging surfaces.

17. A calling device comprising a casing having a dial face impulse mechanism including a plurality of engaging means for variably adjusting said mechanism suitably arranged within said casing, a shaft member for said mechanism extending through said casing, a setting member and indicator secured to said shaft and suitably located in association with said dial face, and means also carried by said shaft and located entirely within said casing and adapted to coöperate with said engaging means when said setting member is operated for adjusting said member.

18. A calling device comprising impulse mechanism, a rotatable setting member normally operatively disengaged from said mechanism and adapted to be moved into operative engagement with said mechanism for adjustment thereof, and means for locking said setting member in such engagement during rotary adjusting operation thereof.

19. A calling device comprising impulse mechanism, a setting member operatively disengaged from said mechanism and normally movable without affecting said mechanism, said setting member being adapted to be moved into operative engagement with the mechanism for adjustment thereof, and means for locking said member in such engagement during the adjusting movement thereof.

20. A calling device comprising impulse mechanism, a setting member normally operatively disengaged from said mechanism and adapted to be moved into engagement with said mechanism for adjustment thereof, means for locking said member in such engagement during the adjustment movement thereof, and shunt contacts operated and held operated by the setting member while it is held in such operative engagement.

Signed by me at Chicago, county of Cook, and State of Illinois, in the presence of two witnesses.

GEORGE E. MUELLER.

Witnesses:
 M. R. ROCHFORD,
 CARRIE E. ANDERSON.